March 18, 1952 J. C. STANNOW 2,589,515
ARRANGEMENT IN AUTOMATIC RECORD CHANGERS
Filed July 3, 1946
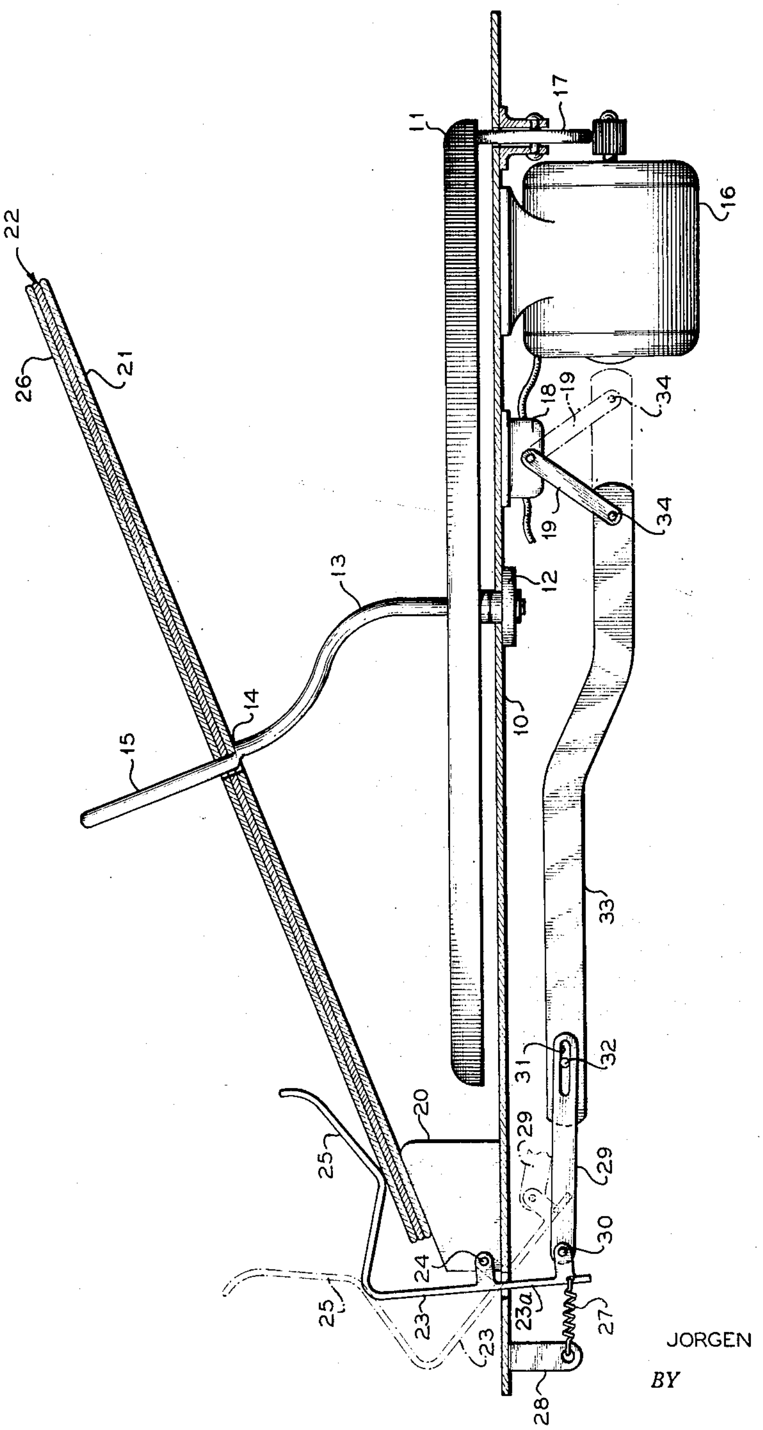
*INVENTOR.*
JORGEN CHRISTIAN STANNOW
*BY*
Janiel. Marble
ATTORNEY Patented Mar. 18, 1952 2,589,515

UNITED STATES PATENT OFFICE 2,589,515

ARRANGEMENT IN AUTOMATIC RECORD CHANGERS

Jörgen Christian Stannow, Lidingo, Sweden, assignor to Svenska Aktiebolaget Gasaccumulator, Lidingo, Sweden, a corporation of Sweden Application July 3, 1946, Serial No. 681,179
In Sweden October 29, 1945

2 Claims. (Cl. 274—10)

The present invention relates to an arrangement in automatic record changers.

Certain types of automatic record changers, such as that shown in patent to F. J. Offen, 2,293,212, granted August 18, 1942, are provided with a central spindle projecting upwardly from the turntable, this spindle having a shoulder intermediate the ends thereof and with the portion of the spindle above the shoulder offset to receive and support a stack of records with the offset portion of the spindle extending aperture in the records. In operation, the lowermost record of the stack is moved transversely of the spindle until the aperture in this record coincides with the portion of the spindle below the shoulder, whereupon the record moves downwardly on the spindle by reason of the action of gravity and comes to rest on the upper surface of the turntable in playing position.

Unless the records are maintained in a position perpendicular to the axis of the offset portion of the spindle, movement of the lowermost record to deposit the same on the turntable has often resulted in jamming of the same with the result that the record breaks or the central aperture becomes enlarged, whereupon the record may assume an eccentric position upon the turntable and cause undesirable lateral movement of the pick-up arm, with the result that inferior reproduction is obtained.

Attempts have been made in the past to overcome this jamming of the record and enlargement of the central aperture by providing a support for the record disposed outwardly of the turntable and engaging the lowermost record adjacent the perimeter thereof. There has also been provided a retaining means disposed above the records for engaging the same and urging the stack downwardly upon the support in order to firmly retain the records in position perpendicular to the offset portion of the spindle. Heretofore this retaining means has been manually actuated and must be moved into engagement with the uppermost record of the stack when it is desired to initiate operation of the record-changer, and must be moved upwardly and outwardly away from the records in order to permit application of a new stack or single record upon the spindle without interfering with the same. This has resulted in needless manual operations and, very frequently, the operator will forget to move the retaining means into engagement with the uppermost record which may well result in breakage or enlargement of the central aperture due to the fact that records are very often unbalanced and consequently do not assume a position perpendicular to the offset portion of the spindle in the absence of the retaining means engaging the uppermost record of the stack.

The object of the present invention is to provide a mechanism including a lower fixed support and an upper movable retaining means the latter being operated by the same mechanism which actuates the starting and stopping switch of the motor. Thus the retaining means operates in such a manner that it will be moved inwardly and downwardly towards the records, when the motor is started and will be moved upwardly and outwardly, when the motor is stopped, and will remain in this position to permit unimpeded application of records to the spindle and support.

One form of mechanism made according to this invention is illustrated in the accompanying drawing, wherein the single figure is an elevational view partially in section. The record-changer of this invention is mounted upon a base plate 10, there being a turntable 11 rotatably mounted on a bearing 12 carried by the base plate 10, bearing 12 also serving to receive and support an upstanding spindle 13 having a shoulder 14 and an offset portion 15. The turntable 11 is driven by a motor 16 through gearing 17 and the operation of the motor 16 is controlled by a switch 18. Switch 18 is actuated by an arm 19 extending therefrom.

Disposed outwardly of the turntable 11 and mounted on the base plate 10 is a lower support 20 which engages the lower surface of the lowermost record 21 of a stack 22. The record stack 22 thus rests on the shoulder 14 of the spindle 13 and upon the lower support 20.

In order to yieldably maintain the record stack 22 in position, there is provided a retaining means 23 pivotally mounted at 24 on the support 20, retaining means 23 having an inwardly extending arm 25 which, in the position shown in full lines in the drawing, is adapted to engage the upper surface of the uppermost record 26 and firmly hold the record stack 22 between the arm 25 and the support 20.

Retaining means 23 is provided with a portion 23a extending below pivot point 24 and a spring or other suitable biasing means 27 engages the portion 23a and a fixed member 28 secured to the base plate 10.

An actuating mechanism for the retaining means 23 is provided in the form of a link 29 pivotally secured to the portion 23a of the retaining means 30, link 29 being provided with a slot 31 for slidably receiving a pin 32 mounted adjacent the end of a link 33 which, in turn, is pivotally secured at 34 to the actuating arm 19 of the switch 18.

As shown in full lines in the drawing, the retaining means 23 and the switch actuating arm 19 is in position to energize the motor 16 and clamp the record stack 22 between the arm 25 and the support 20. This position is maintained until all of the records are deposited on the turntable 11 and played, at which time the arm 25 of the retaining means 23 will rest upon the upper surface of support 20. Movement of the actuating arm 19 of the switch 18 to the dotted line position shown in the drawing to de-energize the motor 16 and stop rotation of the turntable 11 will result in moving the retaining means 23 to the position shown in dotted line in order to permit unimpeded application of one or more new records to the offset portion 15 of the spindle 13. Upon application of the new stack of records, the actuating arm 19 of the switch 18 will be returned to the full line position to energize the motor 16 and start operation of the record player. The pin and slot connection provided by the slot 31 in the link 29 and the pin 32 in the link 33 results in a lost motion connection which permits yieldable engagement of the arm 25 of the retaining means 23 with the uppermost record 26 of the stack 22, regardless of the height or number of records in such stack within the limits of the record playing mechanism.

It will thus be seen that by the above described invention there has been provided a relatively simple mechanism for use in automatic record changers to automatically move a record-retaining means from operative to inoperative position and vice versa merely by actuating the switch which serves to start or stop the record changer.

It will be obvious to those skilled in the art that various changes may be made in the invention without departing from the spirit and scope thereof and, therefore, the invention is not limited by that which is shown in the drawing and described in the specification, but only as indicated in the appended claims.

What is claimed is:

1. An automatic record changer for record players having a base plate, a turntable rotatably mounted on said base plate, a motor for driving said turntable, a switch for energizing and de-energizing said motor, actuating means for said switch and a central spindle extending upwardly from said turntable and having an offset shoulder for supporting a stack of records above said turntable, said record changer including a record support mounted on said base plate radially outwardly of said turntable and engaging the lower surface of the lowermost record adjacent the perimiter thereof, retaining means pivotally mounted on said base plate and having a record engaging arm extending inwardly toward said spindle in one position to engage the upper surface of the uppermost record adjacent the perimeter thereof and directly above said support, means to bias said retaining means into engagement with the uppermost record to firmly retain said records in position on said shoulder and on said support and operating means connecting said retaining means and said switch actuating means and including a lost motion connection whereby upon movement of said actuating means to energize said motor said retaining means will be operated to move said arm into engagement with the uppermost record, said lost motion connection permitting engagement of said arm with stacks of different heights and upon movement of said actuating means to de-energize said motor and said retaining means will be operated to move said arm to a second position outwardly of said support to permit unimpeded application of records to said spindle and said support.

2. An automatic record changer for record players as defined in claim 1 in which the means to bias said retaining means into engagement with the uppermost record comprises a spring.

JÖRGEN CHRISTIAN STANNOW.

REFERENCES CITED

The following references are of record in the file of this patent:

UNITED STATES PATENTS

| Number | Name | Date |
|---|---|---|
| 2,235,693 | Wells | Mar. 18, 1941 |
| 2,291,158 | Holstensson et al. | July 28, 1942 |

FOREIGN PATENTS

| Number | Country | Date |
|---|---|---|
| 114,287 | Sweden | June 19, 1945 |